(12) United States Patent
Bening et al.

(10) Patent No.: US 10,287,428 B2
(45) Date of Patent: May 14, 2019

(54) HEAT ACTIVATED GELS FOR CABLE FILLING APPLICATIONS

(71) Applicant: KRATON POLYMERS U.S. LLC, Houston, TX (US)

(72) Inventors: Robert C. Bening, Houston, TX (US); Erin Murphy, Houston, TX (US); Carl L. Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 393 days.

(21) Appl. No.: 15/175,590

(22) Filed: Jun. 7, 2016

(65) Prior Publication Data

US 2016/0362545 A1 Dec. 15, 2016

Related U.S. Application Data

(60) Provisional application No. 62/174,889, filed on Jun. 12, 2015.

(51) Int. Cl.

| | |
|---|---|
| *C08L 53/00* | (2006.01) |
| *G02B 6/25* | (2006.01) |
| *G02B 6/44* | (2006.01) |
| *G02B 6/255* | (2006.01) |

(52) U.S. Cl.
CPC .............. *C08L 53/005* (2013.01); *G02B 6/25* (2013.01); *G02B 6/255* (2013.01); *G02B 6/4494* (2013.01); *C08L 2203/20* (2013.01); *C08L 2205/025* (2013.01)

(58) Field of Classification Search
CPC .................................................. C08L 53/005
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw |
| 3,670,054 A | 6/1972 | De La Mare et al. |
| 3,700,633 A | 10/1972 | Wald et al. |
| 3,948,845 A | 4/1976 | Marx et al. |
| 4,039,593 A | 8/1977 | Kamienski et al. |
| 4,055,616 A | 10/1977 | Keen et al. |
| 4,107,236 A | 8/1978 | Naylor et al. |
| 5,221,534 A | 6/1993 | Deslauries et al. |
| 5,374,680 A | 12/1994 | Chundry et al. |
| 5,460,739 A | 10/1995 | Rhodes et al. |
| 5,737,469 A | 4/1998 | Costello et al. |
| 5,777,031 A | 7/1998 | Djiauw et al. |
| 6,034,042 A | 3/2000 | Rhodes |
| 6,310,112 B1 | 10/2001 | Vo et al. |
| 6,492,469 B2 | 12/2002 | Willis et al. |
| 6,881,776 B2 | 4/2005 | Butuc |
| 7,439,301 B2 | 10/2008 | Handlin, Jr. |
| 2008/0319116 A1 | 12/2008 | Fredrickson et al. |
| 2009/0186958 A1 | 7/2009 | St. Clair |
| 2010/0056721 A1 | 3/2010 | Wright et al. |
| 2013/0225020 A1 | 8/2013 | Flood et al. |
| 2014/0329961 A1 | 11/2014 | Sengupta et al. |

OTHER PUBLICATIONS

International Search Report for PCT/US2016/036197, filed Jun. 7, 2016.
Vega, D.A. et al., Phase Behavior and Viscoelastic Properties of Entangled Block Copolymer Gels, J. Poly. Sci., vol. 39, pp. 2183-2197, 2001.

*Primary Examiner* — Catherine S Branch

(57) ABSTRACT

Provided herein is a composition containing a hydrogenated blend of a semi-crystalline, selectively hydrogenated block copolymer, a selectively diblock copolymers lacking semi-crystalline blocks, and a low polarity fluid for cable filling applications. The block copolymer comprises blocks of semi-crystalline hydrogenated polybutadiene, blocks of poly (mono alkenyl arenes), and blocks of hydrogenated, non-crystalline conjugated dienes. The diblock copolymer comprises blocks of poly(mono alkenyl arenes) and blocks of non-crystalline poly(conjugated diene(s)). The compositions can be converted to non-flowable gels and find application as fillers for cables such as fiber optic cables.

20 Claims, No Drawings

HEAT ACTIVATED GELS FOR CABLE FILLING APPLICATIONS

CROSS REFERENCE TO RELATED APPLICATIONS

This application claims priority to U.S. Provisional Application No. 62/174,889 filed Jun. 12, 2015, the entirety of which is incorporated herein by reference.

STATEMENT REGARDING FEDERALLY SPONSORED RESEARCH OR DEVELOPMENT

None.

FIELD OF THE INVENTION

The present disclosure provides heat activated gel compositions comprising semi-crystalline, selectively hydrogenated block copolymers, selectively hydrogenated diblock copolymers lacking semi-crystalline blocks, and low polarity fluids for use in cable filling applications.

BACKGROUND

Block copolymers of various structures have been known for some time. Commonly, two or more blocks are combined in a single polymer which possesses different physical and/or chemical character to make a material having properties that are some combination of those individual blocks. In this way, mono-alkenyl arenes and conjugated dienes have been employed as monomers for such blocks prepared by anionic polymerization. The glassy blocks comprising mono-alkenyl arenes provide physical strength and the rubbery blocks comprising conjugated dienes provide elastomeric character. When arranged in the proper structure such block copolymers, often generically referred to as styrenic block copolymers, form thermoplastic elastomers.

U.S. Pat. No. 3,670,054 to De La Mare et al. discloses block copolymers that have a reduced sensitivity to organic solvents. In particular the block copolymers disclosed include selectively hydrogenated (polybutadiene-polystyrene-polyisoprene-polystyrene-polybutadiene). In addition to possessing the glassy character of polystyrene and the rubbery character of polyisoprene, these block copolymers also possessed some character typical of semi-crystalline polymers since the hydrogenated polybutadiene blocks resembled polyethylene.

U.S. Pat. No. 4,107,236 to Naylor et al. discloses a hydrogenated block copolymer having the structure hydrogenated low vinyl butadiene block-polystyrene block-hydrogenated medium vinyl butadiene block-polystyrene block-hydrogenated low vinyl butadiene block (lvB-S-mvB-S-lvB). Upon hydrogenation, the low vinyl butadiene blocks become semi-crystalline polyethylene and the medium vinyl butadiene block becomes ethylene/butylene rubber.

U.S. Publ. No. 2010/0056721 to Wright et al. discloses selectively hydrogenated linear or radial styrenic block copolymers having terminal semi-crystalline blocks resulting from the hydrogenation of low vinyl butadiene blocks. The block copolymers were used neat or in melt-processed compounds for a variety of film, fiber and molding applications.

U.S. Pat. No. 5,737,469 discloses a gel composition comprising a mineral oil and hydrogenated styrenic block copolymer that makes a gel for the optical fiber cable industry. Optional components are a thixotropic agent and an antioxidant. Once the gel is formed it has high viscosity even in its initial state. As such, these gels are difficult to pump into the small voids and interstices present in cable constructions.

U.S. Pat. No. 6,881,776 discloses two-phase gel compositions obtained by mixing a gelled ester composition comprising a mixture of: 1) an ester compound and a polymer compound selected from the group consisting of triblock copolymers, star polymers, radial polymers, multi-block copolymers, and a combination thereof, and 2) a hydrophobic, non-polar solvent. The disclosed technology comprises use of two separate solvents/solutions to make a composition which had relatively low viscosity upon initial formation but became a cohesive gel upon heating. Such compositions are relatively complex since two different components are separately prepared and then combined.

There continues to be a need for simple formulations which have initially low viscosity and which are very pumpable and yet can be converted to a gel when the non-flowable gel state is desired. In this way cables could be formed with which it would be possible to convert an initially grease-like substance to a non-flowable gel. This would be advantageous for the repair or splicing of the cables. The repair or splicing site would be more solid in character and the cable filling would not flow from the repair or splicing site.

SUMMARY

In the broadest sense the disclosure provides a fluid composition for cable filling and flooding applications containing a semi-crystalline, selectively hydrogenated block copolymer having at least one semi-crystalline polyethylene block, a selectively hydrogenated diblock copolymers lacking semi-crystalline blocks, and a low polarity fluid which has a relatively low viscosity upon formation and later may become a non-flowable gel after heating.

In one embodiment, the present disclosure provides a composition useful for cable filling gels containing a blend of a semi-crystalline, selectively hydrogenated block copolymer having the general formula $C-A_1-B_1$ wherein C is a hydrogenated block of butadiene having a vinyl content of 15 mol % or less and a molecular weight less than the molecular weight of the $A_1$ block, $A_1$ is a mono-alkenyl arene block, $B_1$ is a hydrogenated polymer block of conjugated diene wherein the vinyl content is greater than 25 mol %, a selectively hydrogenated diblock copolymers lacking semi-crystalline blocks having the general formula $A_2-B_2$, and a low polarity fluid where the blend is a low viscosity fluid containing a dispersed solid phase at 21° C.

The disclosure further provides a process for forming a heat activated gel including heating the composition to a temperature of at least 130° C. wherein said composition includes a semi-crystalline, selectively hydrogenated block copolymer having the general formula $C-A_1-B_1$ wherein C is a semi-crystalline, hydrogenated block of butadiene having a vinyl content of 15 mol % or less and a molecular weight less than the molecular weight of the $A_1$ block, $A_1$ is a mono-alkenyl arene block, $B_1$ is a non-crystalline, hydrogenated polymer block comprising conjugated diene, a diblock copolymer having the general formula $A_2-B_2$, and a low polarity fluid wherein the semi-crystalline, selectively hydrogenated block copolymer is dispersed in the low polarity fluid.

The disclosure further provides a cable containing a blend of a semi-crystalline, selectively hydrogenated block copolymer having the general formula $C-A_1-B_1$ wherein C is a hydrogenated block of butadiene having a vinyl content of 15 mol % or less and a molecular weight less than the molecular weight of the $A_1$ block, $A_1$ is a mono-alkenyl arene block, $B_1$ is a hydrogenated polymer block of conjugated diene wherein the vinyl content is greater than 25 mol %, a selectively hydrogenated diblock copolymer lacking semi-crystalline blocks having the general formula $A_2$-$B_2$, and a low polarity fluid where the blend is a low viscosity fluid containing a dispersed solid phase at 21° C. and processes for forming such cables.

In a further embodiment the disclosure provides is a process for splicing or severing the cable where the cable contains a blend of a semi-crystalline, selectively hydrogenated block copolymer having the general formula C-$A_1$-$B_1$ wherein C is a hydrogenated block of butadiene having a vinyl content of 15 mol % or less and a molecular weight less than the molecular weight of the $A_1$ block, $A_1$ is a mono-alkenyl arene block, $B_1$ is a hydrogenated polymer block of conjugated diene wherein the vinyl content is greater than 25 mol %, a selectively hydrogenated diblock copolymer lacking semi-crystalline blocks having the general formula $A_2$-$B_2$, and a low polarity fluid where the blend is a low viscosity fluid containing a dispersed solid phase at 21° C.

DETAILED DESCRIPTION

The compositions of the present disclosure include semi-crystalline, selectively hydrogenated block copolymers having the general formula C-$A_1$-$B_1$ and selectively hydrogenated diblock copolymers having the general formula $A_2$-$B_2$ in which C is a hydrogenated, low vinyl polybutadiene block and is semi-crystalline, $A_1$ and $A_2$ are polymer blocks of a mono-alkenyl arene monomer, and $B_1$ and $B_2$ are hydrogenated polymer blocks of conjugated diene monomer having no or little crystallinity. Polymers analogous to the C-$A_1$-$B_1$ structures, but possessing at least two $A_1$ blocks, such as C-$A_1$-$B_1$-$A_1$-C or (C-$A_1$-$B_1$)-X, where "X" represents a coupling site such that the final product possess at least two $A_1$ blocks per chain may also be used in this application.

The C block is semi-crystalline and has the structure of polyethylene. It results from the hydrogenation of a low vinyl content polybutadiene block. 1,3-butadiene monomer can be polymerized by 1,4-addition to yield linear repeat units along the polymer backbone. It can alternately be polymerized by 1,2-addition to yield branched repeat units. Typically, the anionic polymerization techniques employed to make the block copolymers of this invention yield a mixture of 1,4- and 1,2-addition repeat units. For the purpose of this invention, the vinyl content of the C block is defined as the amount of units polymerized by 1,2-addition. In order to make a semi-crystalline C block, polybutadiene blocks of low or no vinyl content are first polymerized and then subsequently hydrogenated in a post-polymerization reaction. Before hydrogenation, the vinyl content of the low vinyl polybutadiene block is less than 15 mol % based on the total number of butadiene repeat units in the block. Because the semi-crystalline character of the C block is essential and the melting point and degree of crystallinity of this block decreases with increasing vinyl content, it is preferred to have a vinyl content of 12 mol % or less and most preferred to have 10 mol % or less. At vinyl contents of 15 mol % or greater, the C block is not sufficiently crystalline to provide the advantageous rheology or storage and handling properties.

The C block is relatively small, having a molecular weight less than the molecular weight of the adjacent $A_1$ block polymer. The C block must be sufficiently large to have a melting point of at least 74° C. If it is too large, and in particular larger than the $A_1$ block, the block copolymer will not yield the desired thixotropic fluid or elastic gel, or decrease the thermal stability of the resulting thixotropic fluid or gel. Without being bound by theory, it is believed that the presence of too large of a C block prevents the organization of the $A_1$ blocks which is responsible for formation of the structured solutions that generate the desired rheology. When the block copolymer is used in thixotropic fluids the molecular weight of the C block is less than 20,000 g/mol and the molecular weight of the $A_1$ block is at least 20,000 g/mol. When the block copolymer is used in cohesive gels the molecular weight of both the C and $A_1$ block can be smaller. However, the C block must be smaller than the $A_1$ block for the reasons already explained. In preferred embodiments where the block copolymer is used in thixotropic fluids the molecular weight of the C block is from 4,000 to less than 20,000 g/mol and in most preferred embodiments it is from 6,000 to 15,000 g/mol. At molecular weights less than 4,000 the C block is too small to express its semi-crystalline character in this embodiment.

The C blocks have a melting point of at least 74° C. In the more preferred embodiments the melting point is at least 80° C. and in the most preferred embodiments the melting point is at least 85° C.

The A blocks ($A_1$ and $A_2$ blocks) are formed by polymerization of mono-alkenyl arene monomers. The mono-alkenyl arene may be styrene, a-methylstyrene, methylstyrenes other than a-methylstyrene, vinyl toluene, para-butylstyrene, ethylstyrene and vinylnapthalene, and these can be used alone or in combination of two or more. Preferred is styrene. The A blocks are not hydrogenated to a significant degree during the selective hydrogenation process.

The $A_1$ block of the semi-crystalline, selectively hydrogenated block copolymer must be sufficiently large to provide a driving force for micelle formation in the low polarity fluid. Further, it must be large enough to provide strength when cohesive gels are formed. The molecular weight of the $A_1$ block is at least 5,000 g/mol. In preferred embodiments the molecular weight is at least 9,000 g/mol, more preferred is at least 20,000 g/mol, and most preferred is 30,000 to 100,000 g/mol. In all cases, the molecular weight of the $A_1$ block is greater than that of the C block in any particular semi-crystalline, selectively hydrogenated block copolymer.

The B blocks ($B_1$ and $B_2$ blocks) are polymer blocks of a conjugated diene and have rubbery character. The conjugated diene may be 1,3-butadiene, substituted butadiene such as isoprene, piperylene, 2,3-dimethyl-1,3-butadiene, myrcene, and 1-phenyl-1,3-butadiene or mixtures thereof. Preferred is 1,3-butadiene (herein referred to as butadiene) and isoprene. In all cases, the B block is non-crystalline and has crystallinity levels of 1% or less as measured by calorimetry. When 1,3-butadiene is the monomer, it is polymerized such that the vinyl content (1,2-addition content) of the B block is at least 25 mol % based on the total number of butadiene repeat units in the block, and in preferred embodiments is at least 30 mol %. When isoprene is the monomer all vinyl contents (3,4-addition contents) normally obtainable by anionic polymerization in hydrocarbon solvents in the absence of polar additives are useful since its structure does not readily crystallize. The B blocks are selectively hydrogenated in a post-polymerization reaction.

The molecular weight of the $B_1$ block of the semi-crystalline, selectively hydrogenated block copolymer should be sufficiently high to provide good thickening efficiency in low polarity fluids. Additionally, higher molecular weights relative to the C and $A_1$ blocks increase the solubility of the block copolymer in the low polarity fluids. The molecular weight of the $B_1$ block should not be so large as to cause the $C-A_1-B_1$ polymer to be soluble in the base fluid at 70° F. In the present invention, the molecular weight of the $B_1$ blocks is at least 70,000 g/mol. In preferred embodiments the $B_1$ block molecular weight is from 75,000 to 200,000 g/mol, more preferred is from 80,000 to 160,000 g/mol, and most preferred is from 90,000 to 150,000 g/mol.

As used herein, the term "semi-crystalline" means blocks having calorimetrically observable melting endotherms. Non-crystalline means blocks having less than 1% crystallinity as determined by calorimetry.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens, make particularly suitable solvents. Frequently used are cyclic alkanes, such as cyclopentane, cyclohexane, cycloheptane, and cyclooctane, all of which are relatively non-polar. Other suitable solvents may be selected to perform effectively in a given set of process conditions, with temperature being one of the major factors taken into consideration.

Anionic polymerizations are initiated by specific compounds. Such compounds may include, but are not limited to, for example, alkyl lithium compounds and other organolithium compounds such as s-butyllithium, n-butyllithium, t-butyllithium, amyllithium and the like. The lithium initiator process is well known and is described in, for example, U.S. Pat. Nos. 4,039,593 and RE 27,145. Where symmetric, linear copolymers are desired, it is possible to use di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred.

The vinyl content of the conjugated diene B block is controlled by addition of a microstructure control agent during polymerization and described in, for example, U.S. Pat. Nos. RE 27,145, 5,777,031 and 7,439,301. The microstructure control agents are normally polar compounds soluble in the polymerization solvent such as alkyl ethers such as, for example, diethyl ether and 1,2-diethoxypropane. However, any microstructure control agent known in the art and useful for the polymerization of conjugated dienes may be used herein. The modifier may be added after all of the low vinyl butadiene segments have been polymerized. When polymerizing isoprene, it is not necessary or desirable to add a microstructure modifier, as the product of hydrogenation of the polymer obtained in the above solvents will not be crystalline.

The blocks of the copolymers described herein may be polymerized in a linear fashion by sequential addition of the monomers. In such a case, the $C-A_1-B_1$ and $A_2-B_2$ structures may be formed.

Hydrogenation may be carried out via any of the several hydrogenation or selective hydrogenation processes. For example, such hydrogenation has been accomplished using methods such as those described in, for example, U.S. Pat. Nos. 3,595,942, 3,634,549, 3,670,054, 3,700,633 and RE 27,145. Hydrogenation may be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably at least about 98 percent of the conjugated diene double bonds are reduced.

The molecular weights referred to herein may be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used is preferably a combination ultraviolet and refractive index detectors. The molecular weights expressed herein are measured at the peak of the GPC trace and are commonly referred to as "peak molecular weights". The molecular weights of the individual blocks are determined by difference: the molecular weight of the C block ($M_C$) is measured after its polymerization, then the molecular weight of the C-A diblock ($M_{CA}$) is measured after its polymerization and so on. For example, the molecular weight of the A block is then determined as $M_A = M_{CA} - M_C$. This difference can be calculated from styrene equivalent molecular weights and then the true molecular weights of each block calculated by the conversion mentioned herein. Alternately, the true molecular weights of each homopolymer block, diblock, triblock, etc. can be first determined by conversion of the styrene equivalent molecular weights and then the difference can be calculated. The first method is preferred. Unless otherwise specified, the term "molecular weights" refers to the true molecular weight in g/mol of the polymer or block of the copolymer.

Preferable low polarity fluids include mineral oil, low toxicity synthetic oils such as Drakeol® 34 (Calumet/Penreco.), or so-called gas-to-liquid synthetic oils such as the Risella oils sold by Shell Oil Co. with the gas-to-liquid oils being most preferred as they have the least tendency to prematurely dissolve the polymer and also provide a higher service temperature than mineral oils. Suitable mineral oils may be naphthenic- or paraffinic-based. Under some circumstances more polar fluids such as diesel, biodiesel and carboxylic acid esters such as 2-ethylhexyl oleate may yield suitable results but these are more likely to prematurely dissolve the polymer or result in fluids that undergo severe viscosity loss at too low of a temperature. A preferred example of a gas-to-liquid oil is Risella X420.

The compositions provided herein comprise a semi-crystalline, selectively hydrogenated block copolymer as described herein in a low polarity fluid. The composition and structure of the semi-crystalline, selectively hydrogenated block copolymer determine whether a dispersed composition can be formed and the rheological properties of any such dispersed composition. While the applicants do not wish to be bound by theory, it is thought that such dispersed compositions are formed because of the different solubilities of the C, $A_1$, and $B_1$ blocks in the low polarity fluid and because of the semi-crystalline nature of the C block. At lower temperatures the semi-crystalline block inhibits dissolution of the polymer, so that the polymer can be dispersed in the non-polar medium, and remains largely undissolved. At this point, the viscosity is determined by the viscosity of the oil. Upon heating, the polymer dissolves. Due to the lower solubility of the $A_l$ block in such fluids, structured solutions are formed. In the case of C-$A_1$-$B_1$ structures, this results in a micelle structure of the block copolymer in the fluid. The C blocks are less soluble and formed a collapsed core. The $B_1$ blocks, however, are chosen so as to be readily soluble in the non-polar fluid. At this point the $B_1$ block copolymer segment becomes more greatly solvated by the fluid, resulting in a "corona" comprised of highly-extended chain; the resulting micelle structures impart thixotropic character to the fluid.

The preferred process for preparing compositions of the block copolymer in the low polarity fluid is to add the solid polymer to the fluid while mixing under conditions suitable for efficiently distributing and suspending the polymer. The temperature should be maintained at no more than about 43° C. and preferably at 30° C. or lower and most preferably at 21° C. or lower. The composition will contain up to about 10 wt. % of the semi-crystalline, selectively hydrogenated block copolymer in mineral oil, low toxicity synthetic oils such as Drakeol® 34 (Calumet/Penreco.), or so-called gas-to-liquid synthetic oils such as the Risella oils sold by Shell Oil Co. Preferred compositions will contain 2 to 10 wt. % of the semi-crystalline, selectively hydrogenated block copolymer and more preferred ones will contain 4 to 8 wt. %. Formation of the composition is best accomplished using a rotor-stator type high shear mixer. However, any mixing apparatus capable of producing sufficient shear to uniformly disperse the block copolymer may be used. Mixing times may be as short as about 15 minutes. Such suspensions of the C-$A_1$-$B_1$ polymers of the present invention generally evidence separation on standing, resulting in the formation of a free oil layer when the suspension is heated. A variety of thixotropic agents can be added to inhibit this, including inorganic rheology modifiers such as CAB-O-SIL® TS720 from Cabot Corp., but the preferred approach is to add a diblock copolymer at a sufficient concentration to inhibit settling.

The diblock copolymer of the present invention is selectively hydrogenated and lacks semi-crystalline blocks. The diblock copolymer has the general formula $A_2$-$B_2$. The blocks $A_2$ and $B_2$ may vary in composition, microstructure and molecular weight, independently, from the monoalkenyl arene and conjugated diene blocks, $A_1$ and $B_1$, of the selectively hydrogenated, semi-crystalline block copolymer.

The diblock copolymers useful in the present invention are polystyrene—hydrogenated polyisoprene ($A_2$-$B_2$) diblock copolymers. These copolymers have a polystyrene content ranging from about 20 to about 50 wt. %. In more preferred embodiments the polystyrene content ranges from about 25 to about 40 wt. %. The apparent molecular weight of the diblock copolymers ranges from about 100,000 to about 200,000 g/mol. In more preferred embodiments the apparent molecular weight ranges from 110,000 to about 190,000 g/mol.

Addition of any diblock can be done by pre-dissolving the diblock polymer in the fluid or by adding it with the selectively hydrogenated, semi-crystalline block copolymer provided that the diblock copolymer is also in an easily dispersible or soluble form. The diblock may be dissolved first by heating the mixture of the diblock and fluid and then cooling before the addition of the selectively hydrogenated, semi-crystalline block copolymer.

The mass ratio of semi-crystalline selectively hydrogenated block copolymer to diblock copolymer ranges from 75:25 to 25:75 on a weight basis. In preferred embodiments this weight ratio is from 70:30 to 30:70 and in most preferred embodiments it ranges from 60:40 to 40:60. These solutions exhibit substantially lower viscosities than solutions of the same concentration of the $A_2$-$B_2$ polymer alone, allowing for the preparation of fluids that exhibit much higher viscosities after heating while remaining easy to pump.

The total polymer content in the heat activated gel is in an amount sufficient to create a material which will not flow under mild compression after heat activation. For example, after activation the gel will not flow under its own weight at room temperature over a 24 hour period. Such gels comprise from about 1 to about 20 wt. % total polymer where the total polymer mass is the sum of the semi-crystalline, selectively hydrogenated block copolymer and the diblock copolymer. In preferred embodiment the total polymer mass makes up from about 2 to about 16 wt. % and in more preferred embodiments from about 4 to about 12 wt. %.

The non-flowable gels described herein may be formed by heating the dispersion compositions to a temperature of at least 65° C. In preferred embodiments this conversion is conducted at temperatures of at least 80° C. and most preferred at least 93° C. Conversion of the dispersion composition to a gel is irreversible. Once the gel is formed the low viscosity dispersion composition state cannot be reformed without significant change of the composition, for example, by addition of new components such as polar or aromatic solvents or by degradation of the block copolymer or fluid by some physical or chemical process. Fluids prepared from mixtures of C-$A_1$-$B_1$ and $A_1$-$B_2$ block copolymers retain their essential grease-like character after heating, that is, they remain pumpable, albeit with a very high viscosity.

The compositions provided herein are particularly useful in cable filling applications. Severable or spliceable fiber optic cables of the present invention comprise fiber optic waveguide in a flexible sleeve or sheath. The sleeve or sheath is filled with the heat activated gel composition. Filling the cable is done to avoid heat activating the gelation. The cables are filled with the heat activated gels at temperatures less than 130° C.

This description of fiber optic cables is made by way of example. The compositions provided herein may be used with any type of cable in which an oil, grease or gel filling is desired.

When it is desirable to sever or splice the optic fiber cable, the portion of the cable that will be severed or spliced is heated until the heat activated gel solidifies. The cable is heated to at least 130° C. to activate the gel. The cable is then severed at such portion and may be spliced to another spliceable fiber optic cable.

EXAMPLES

The following examples demonstrate the heat activated gel. Table 1 lists two semi-crystalline, selectively hydrogenated block copolymers, CAB3 and CAB4 which were used in these examples. The diblock used in the examples is identified as AB1 and its characteristics are also listed in Table 1.

TABLE 1

| Sample | C Block MW (g/mole) | C Block Vinyl Content (mol %) | A Block MW (g/mole) | B Block MW (g/mole) |
| --- | --- | --- | --- | --- |
| CAB3 | 15,000 | 8 | 80,000 | 109,000 |
| CAB4 | 13,000 | 8 | 90,000 | 142,000 |
| AB1 | None | None | 36,000 | 96,000 |

Example 1

Preparation of the Heat Activated Gel

CAB3 and AB1 were simultaneously added and mixed at a 50:50 weight ratio to Risella® 420 oil. The total amount of block copolymer was 8 wt. % based on the total weight of the composition. Mixing was conducted, starting at room temperature, with a Silverson mixer for 1 hour at 2500 rpm. The mixing temperature was observed to increase from room temperature to 39° C. during high-shear mixing. The resulting blend exhibited no sign of settling (i.e., no free oil layer) after standing for one hour.

Viscosity was tested by applying a standard procedure for cable filling gels using a Brookfield HBDV-II+Pro Viscometer with a CPE52 spindle at 25° C. Some undissolved particles were observed. The results are listed in Table 2, along with the data for a comparative example comprising an 8 wt. % solution of polymer AB 1 in oil mixed at 140° C. The viscosity of the CAB3/AB 1 blend prepared without heating was clearly lower. The viscosity of the blend measured at a high shear rate ($200\ s^{-1}$) was only about 1/5 that of the viscosity of the comparative example. When the inventive blend was heated to 140° C. for two hours, the viscosity increased markedly and fluid appeared free of undissolved solids. The ratio of low/high shear viscosity (i.e., $6\ s^{-1}/200\ s^{-1}$) of the blend increased from 4.8 to 7.0, indicating that the dissolution of the CAB3 polymer had the desired effect of increasing the integrity of the polymer network at low shear rates. The final value exceeded that of the comparative example. The samples were subjected to three standard tests used to evaluate the performance of cable gels: oil separation over 24 hours at 80° C., oil separation over 24 hours at 100° C., and a "drop point" test which measures the temperature at which oil beings to bleed from the gel. Prior to heating to 140° C., the sample did not exhibit the necessary rheological characteristic to pass the oil separation test. Following heating, the blend performed as well or better than the control, despite its lower initial viscosity. This result indicates that additional heating was required to fully dissolve the CAB3 polymer and produce the desired gel structure.

TABLE 2

| | Polymer | | |
|---|---|---|---|
| | AB1 Mixing at 120° C. | CAB3:AB1 (50:50) As Initially Mixed | CAB3:AB1 (50:50) After Heating to 141° C. |
| Polymer Concentration (wt.) | 8% | 8% | 8% |
| Viscosity @ 25, cps    $6\ s^{-1}$ | 32941 | 5645 | 27517 |
| $50^{-1}$ | 8088 | 1969 | 7969 |
| $200^{-1}$ | 4941 | 1162 | 3913 |
| $6\ s^{-1}/200\ s^{-1}$ | 6.7 | 4.9 | 7.0 |
| Oil Separation | Pass | Fail | Pass |
| Oil Separation (@ 80, 24 hrs, %) | 0 | 15 | 0 |
| Oil Separation (@ 100, 24 hrs, %) | 0 | 10 | 0 |
| Mixing Time | 1 h | 1 h | 2 h at 140° C. |
| Dropping Point (° C.) | 209 | 209 | 211 |

Example 2

Preparation of Blends

Blends were made and tested according to Example 1 with the exception that CAB4 was used in place of CAB3. During initial mixing the temperature of the CAB4/AB1/Risella 420 blend increased from room temperature to 42° C. The resulting inventive blend of this example did not exhibit settling after 1 hour. Some undissolved particles were observed, although, their size and number were smaller than in the inventive blend of Example 1. The results are listed in Table 3. The high shear rate viscosity of the blend is only about half that of the comparative example. Unlike Example 1, the blend was able to pass the oil separation test without aging at 140° C. This data suggests that the heat history of the test itself was enough to dissolve the CAB4 polymer and produce the desired gel structure.

The initially blended sample was then heated for 2 hours at 140° C. As in Example 1, the majority of the CAB was observed to dissolve, resulting in a substantial increase in the viscosity, especially at low shear rates. As in Example 1, the ratio of the $6\ s^{-1}/200\ s^{-1}$ viscosities exceeded that of the Comparative Example and the oil separation and drop point values were comparable despite the lower initial viscosity.

TABLE 3

| | Polymer | | |
|---|---|---|---|
| | AB1 Mixing at 120° C. | CAB4:AB1 (50:50) As Initially Mixed | CAB4:AB1 (50:50) After Heating to 141° C. |
| Polymer Concentration (wt.) | 8% | 8% | 8% |
| Viscosity @ 25, cps    $6\ s^{-1}$ | 32941 | 12965 | 41011 |
| $50^{-1}$ | 8088 | 4752 | 12129 |
| $200^{-1}$ | 4941 | 2564 | 5334 |
| $6\ s^{-1}/200\ s^{-1}$ | 6.7 | 5.06 | 7.7 |
| Oil Separation | Pass | Pass | Pass |
| Oil Separation (@ 80, 24 hrs, %) | 0 | 0 | 0 |
| Oil Separation (@ 100, 24 hrs, %) | 0 | 0 | 0 |
| Mixing Time | 1 h | 1 h | 2 h at 140° C. |
| Dropping Point (° C.) | 209 | 211.5 | 205 |

Thus it is apparent that there has been provided a heat activated oil gel formulation that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

We claim:

1. A heat activated gel for cable filling comprising:
    a) a semi-crystalline, selectively hydrogenated block copolymer having the general formula $C-A_1-B_1$, wherein C is a semi-crystalline, hydrogenated polymer block of butadiene having a vinyl content before hydrogenation of 15 mol % or less and a molecular weight less than the molecular weight of the $A_1$ block, $A_1$ is a mono-alkenyl arene polymer block, and $B_1$ is a non-crystalline, hydrogenated polymer block of a conjugated diene;
    b) a selectively hydrogenated diblock copolymer having the general formula $A_2-B_2$, wherein $A_2$ is a mono-alkenyl arene polymer block, and $B_2$ is a hydrogenated polymer block of a conjugated diene; and
    c) a low polarity fluid, wherein the semi-crystalline, selectively hydrogenated block copolymer and the selectively hydrogenated diblock copolymer are dissolved in the low polarity fluid.

2. The heat activated gel of claim 1 wherein the mass ratio of the semi-crystalline, selectively hydrogenated block copolymer to the selectively hydrogenated diblock copolymer ranges from 75:25 to 25:75.

3. The heat activated gel of claim 1 wherein the total mass of the semi-crystalline, selectively hydrogenated block copolymer and the selectively hydrogenated diblock copolymer is from about 1 to about 20 wt. %.

4. The heat activated gel of claim 1 wherein the mono-alkenyl arene polymer block $A_1$ and the mono-alkenyl arene polymer block $A_2$ are formed by polymerization of styrene.

5. The heat activated gel of claim 1, wherein the conjugated diene in the $B_2$ block is butadiene, isoprene, or mixtures thereof.

6. The heat activated gel of claim 1, wherein prior to hydrogenation, the $B_1$ block, the $B_2$ block, or the $B_1$ and $B_2$ blocks are polybutadiene blocks having a vinyl content greater than 25 mol %.

7. The heat activated gel of claim 1 wherein the low polarity fluid is selected from the group consisting of mineral oil, low toxicity synthetic oils, gas-to-liquid synthetic oils, and mixtures thereof.

8. The heat activated gel of claim 1, wherein the C block has a vinyl content of 10 mol % or less.

9. The heat activated gel of claim 1, comprising from about 4 to about 10 wt. % of a combination of the semi-crystalline, selectively hydrogenated block copolymer and the selectively hydrogenated diblock copolymer, and about 90 to about 96 wt. % of the low polarity fluid.

10. A process for forming a heat activated gel comprising
forming a mixture comprising a semi-crystalline, selectively hydrogenated block copolymer having the general formula $C-A_1-B_1$ wherein C is a semi-crystalline, hydrogenated polymer block of butadiene having a vinyl content before hydrogenation of 15 mol % or less and a molecular weight less than the molecular weight of the $A_1$ block, $A_1$ is a mono-alkenyl arene polymer block, and $B_1$ is a non-crystalline, hydrogenated polymer block of a conjugated diene;
a selectively hydrogenated diblock copolymer having the general formula $A_2-B_2$, wherein A2 is a mono-alkenyl arene polymer block, and B2 is a hydrogenated polymer block of a conjugated diene; and a low polarity fluid; and
optionally heating the mixture.

11. A cable comprising the heat activated gel of claim 1.

12. A process for forming the cable of claim 11, comprising filling the cable with the heat activated gel of claim 1 at a temperature of less than about 130° C.

13. A process for severing the cable of claim 11 comprising heating a zone of the cable to a temperature of at least 130° C. for a time sufficient to activate the gel and then severing the cable in the heated zone.

14. The heat activated gel of claim 1, wherein the heat activated gel has a 6 $s^{-1}$/200 $s^{-1}$ ratio of a low shear viscosity to a high shear viscosity of at least 6.7 after being heated to a temperature of at least 130° C.

15. The heat activated gel of claim 1, wherein the heat activated gel after being heated to a temperature of at least 130° C., and upon standing at a temperature from about 80° C. to about 100° C. for 24 hours, the heat activated gel exhibits no separation of the low polarity fluid.

16. The heat activated gel of claim 1, the heat activated gel has a 6 $s^{-1}$/200 $s^{-1}$ ratio of a low shear viscosity to a high shear viscosity of at least about 6.7 prior to any heat activation.

17. The heat activated gel of claim 1, wherein prior to heat activation, the gel has a 200 $s^{-1}$ high shear viscosity that is about 20%-50% of a 200 $s^{-1}$ high shear viscosity exhibited by a reference sample having only components b) and c).

18. A heat activated gel for cable filling comprising:
a) a semi-crystalline, selectively hydrogenated block copolymer having the general formula $C-A_1-B_1$, wherein:
C is a semi-crystalline, hydrogenated polymer block of butadiene having a vinyl content before hydrogenation of less than 15 mol %, a melting point of at least 74° C., and a molecular weight less than the molecular weight of the $A_1$ block;
$A_1$ is a mono-alkenyl arene polymer block having a molecular weight of at least 9,000 g/mol; and
$B_1$ is a non-crystalline, hydrogenated polymer block of a conjugated diene having a molecular weight from about 80,000-160,000 g/mol;
b) a selectively hydrogenated diblock copolymer having the general formula $A_2-B_2$, wherein A2 is a mono-alkenyl arene polymer block, and B2 is a hydrogenated polymer block of a conjugated diene; and
c) a low polarity fluid.

19. The heat activated gel of claim 18, wherein
the C block has a molecular weight of about 13,000-15,000 g/mol, and a vinyl content prior to hydrogenation of about 8 mol %; the $A_1$ block has a molecular weight of about 80,000-90,000 g/mol; and the B1 block has a molecular weight of about 109,000-142,000 g/mol; and
the $A_2$ block has a molecular weight of about 36,000 g/mol, and
the $B_2$ block has a molecular weight of about 96,000 g/mol.

20. The heat activated gel of claim 18, wherein components a) and b) are present in a 1:1 weight ratio.

* * * * *